United States Patent [19]

Hunziker

[11] Patent Number: 4,757,647
[45] Date of Patent: Jul. 19, 1988

[54] APPARATUS FOR SURFACE TREATMENT OF DISCRETE WORKPIECES

[76] Inventor: Werner Hunziker, Im Köpfli 262, CH-5054 Kirchleerau, Switzerland

[21] Appl. No.: 834,938

[22] Filed: Feb. 28, 1986

[30] Foreign Application Priority Data

Jun. 19, 1985 [CH] Switzerland ............ 2600/85

[51] Int. Cl.$^4$ .............................................. B24C 3/08
[52] U.S. Cl. ........................................ 51/417; 51/422
[58] Field of Search ............... 51/419, 422, 423, 427, 51/17, 417, 215 AR; 198/630, 750, 752

[56] References Cited

U.S. PATENT DOCUMENTS

| | | | |
|---|---|---|---|
| 2,590,819 | 3/1952 | Huyett | 51/426 |
| 3,086,278 | 4/1963 | Fuchs | 51/426 |
| 3,728,822 | 4/1973 | Noble | 51/419 |
| 4,218,854 | 8/1980 | Hunziker | 51/423 |
| 4,680,898 | 7/1987 | Carpenter | 51/419 |

Primary Examiner—Frederick R. Schmidt
Assistant Examiner—Bradley I. Vaught
Attorney, Agent, or Firm—Peter K. Kontler

[57] ABSTRACT

Apparatus for deburring or other surface treatment of workpieces has a tubular housing with a set of axially parallel flexible, elastic or rigid rod- or wire-like components which define gaps and whose end portions are separately affixed to driven rotary end walls. The end walls wobble in synchronism with one another so as to move the components longitudinally while the components orbit about the axis of the receptacle. The workpieces which are admitted into one end of the receptacle are agitated and rotated as a result of rotation of the receptacle and move toward the other end of the receptacle due to reciprocation of components in parallelism with the axis of the receptacle. One or more nozzles admit jets of flames, solid, liquid and/or gaseous media which penetrate through the gaps between the components of the receptacle and treat the workpieces.

24 Claims, 10 Drawing Sheets

APPARATUS FOR SURFACE TREATMENT OF DISCRETE WORKPIECES

CROSS-REFERENCE TO RELATED CASES

The apparatus of the present invention constitutes an improvement over and a further development of apparatus which are disclosed in commonly owned U.S. Pat. Nos. 4,218,854 and 4,368,599.

BACKGROUND OF THE INVENTION

The present invention relates to apparatus for treatment of discrete workpieces, and more particularly to improvements in apparatus which can be utilized to continuously agitate, rotate, advance and/or otherwise manipulate a series of discrete plastic, metallic or other workpieces.

Certain types of metallic and plastic workpieces require surface treatment to remove burrs, webs and/or other projections which are formed in the mold of a casting or an analogous machine. Furthermore, certain workpieces exhibit outwardly extending portions of reinforcing filaments or like parts which affect the appearance of the workpieces and must be removed, e.g., by combustion. Removal of filaments and/or burrs or the like necessitates repeated and frequent rotation of workpieces during movement along a path wherein the workpieces are subjected to the action of flowable gaseous, liquid and/or solid media and/or to the action of flames.

OBJECTS AND SUMMARY OF THE INVENTION

An object of the invention is to provide a novel and improved apparatus for surface treatment of metallic, plastic and/or other workpieces in a predictable manner irrespective of the size, shape, weight and/or other characteristics of the workpieces.

Another object of the invention is to provide an apparatus which can be rapidly converted for the treatment of a wide variety of workpieces.

A further object of the invention is to provide the apparatus with novel and improved means for rotating, advancing and/or otherwise manipulating the workpieces during travel past one or more treating stations.

An additional object of the invention is to provide the apparatus with novel and improved means for changing the extent of agitation and surface treatment or other treatment of workpieces.

Still another object of the invention is to provide the apparatus with novel and improved means for ensuring that the workpieces are caused to advance along and remain at an optimum distance from the source or sources of one or more treating media.

A further object of the invention is to provide an apparatus which can be set up for treatment of different types of workpieces within short intervals of time and whose operation can be automated to a desired extent.

An additional object of the invention is to provide a novel and improved apparatus for deburring metallic or synthetic plastic castings.

Another object of the invention is to provide an apparatus which can subject the workpieces to any desired number of treatments by a single medium or by two or more different media.

An additional object of the invention is to provide a novel and improved method of predictably agitating discrete workpieces during removal of burrs, filaments and/or other surface treatment.

The improved apparatus is used to continuously change the orientation of workpieces and comprises an elongated receptacle which is rotatable about a substantially horizontal axis and has a tubular shell including a plurality of spaced-apart elongated components which extend in substantial parallelism with the axis. The shell has an upper portion at a level above the axis, a lower portion at a level below the axis, a first end portion which is arranged to receive workpieces, and a second end portion which discharges treated workpieces. The apparatus further comprises means for rotating the receptacle about the axis and means for reciprocating the components, at least in the lower portion of the shell, to thereby advance the workpieces from the first toward the second end portion of the receptacle. The components can constitute resilient or nonresilient straight or helically convoluted (spiral) wires, elongated rods, strips, cords, cables, ropes or the like.

The receptacle further comprises a first end wall which is connected with the first end portions and a second end wall which is connected with the second end portions of the components. Each end wall preferably constitutes a wobble plate or swash plate which wobbles while it rotates about the axis of the receptacle to thereby move the components in parallelism with such axis. The means for reciprocating the components of the shell includes means for causing the end walls to wobble during their rotation and, in accordance with a presently preferred embodiment of the invention, the reciprocating means comprises a discrete carrier for each end wall and means for changing the inclination of the carriers with reference to the axis of the receptacle to thus change the extent of reciprocatory movement of the components of the shell. The end walls are rotatably mounted on the respective carriers which are pivotable about parallel axes extending at right angles to the axis of the receptacle. Suitable arresting means can be provided to hold the two carriers in selected positions.

The means for rotating the end walls of the receptacle can comprise a first gear on at least one of the end walls and a motor-driven second gear which mates with the first gear.

In accordance with a modification, each end wall comprises a ring-shaped support which is rotatable by a motor, and a set of levers pivotably mounted on each support. The levers are coupled to the respective end portions of the components of the shell and are pivotable by stationary cams while the respective supports rotate about the axis of the receptacle. Means can be provided to bias preferably roller-shaped followers of the levers against the respective cams. Such biasing means can include or form part of means for tensioning the components of the shell. The arrangement may be such that one end portion of each component is more or less permanently secured to the respective end wall of the receptacle and the other end portion of each component is secured to the other end wall by a discrete tensioning device. Alternatively, each tensioning device can couple the other end wall with several components.

Obstacles in the form of beads or the like can be provided on some or all of the components to regulate the rate at which the workpieces advance from the first toward the second end portion of the shell.

At least one end wall of the receptacle can be provided with rigid or elastic radially inwardly extending prongs which are connected with the respective end portions of the components. The arrangement is preferably such that the components are separably secured to the prongs. The means for separably securing the end portions of the components to the prongs can comprise substantially spherical sockets on the components and substantially cup-shaped members for such sockets. The prongs can be provided with holes for portions of the respective cup-shaped members. The prongs can be mounted on or made integral with two or more discrete or integral ring-shaped sections of the respective end wall so that the prongs are disposed in several planes extending transversely of the axis of the receptacle.

The components of the shell can be tensioned by adjustably securing at least one of the end walls to the housing of the apparatus in such a way that the one end wall can be moved to any one of several positions at different distances from the other end wall. For example, the bearings for one of the end walls can be mounted on an end wall of the housing for movement between two or more positions at different distances from the other end wall of the receptacle.

The means for treating the workpieces in the shell can include means for drying, heating, washing and/or deburring the workpieces. For example, the treating means can comprise one or more nozzles for directing at least one stream of a pressurized flowable medium from the outside of the shell, between the components and against the workpieces in the shell. Such nozzle or nozzles are preferably adjacent to lower portion of the shell. Means can be provided for adjusting the position(s) of the nozzles(s) with reference to the shell, e.g., by moving the nozzle or nozzles up or down closer to or further away from the axis of the receptacle. The nozzle or nozzles can direct streams of burning fuel, steel shot (preferably in a gaseous carrier medium), hot air or a flowable washing medium against the workpieces which are agitated in and advance longitudinally of the shell.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
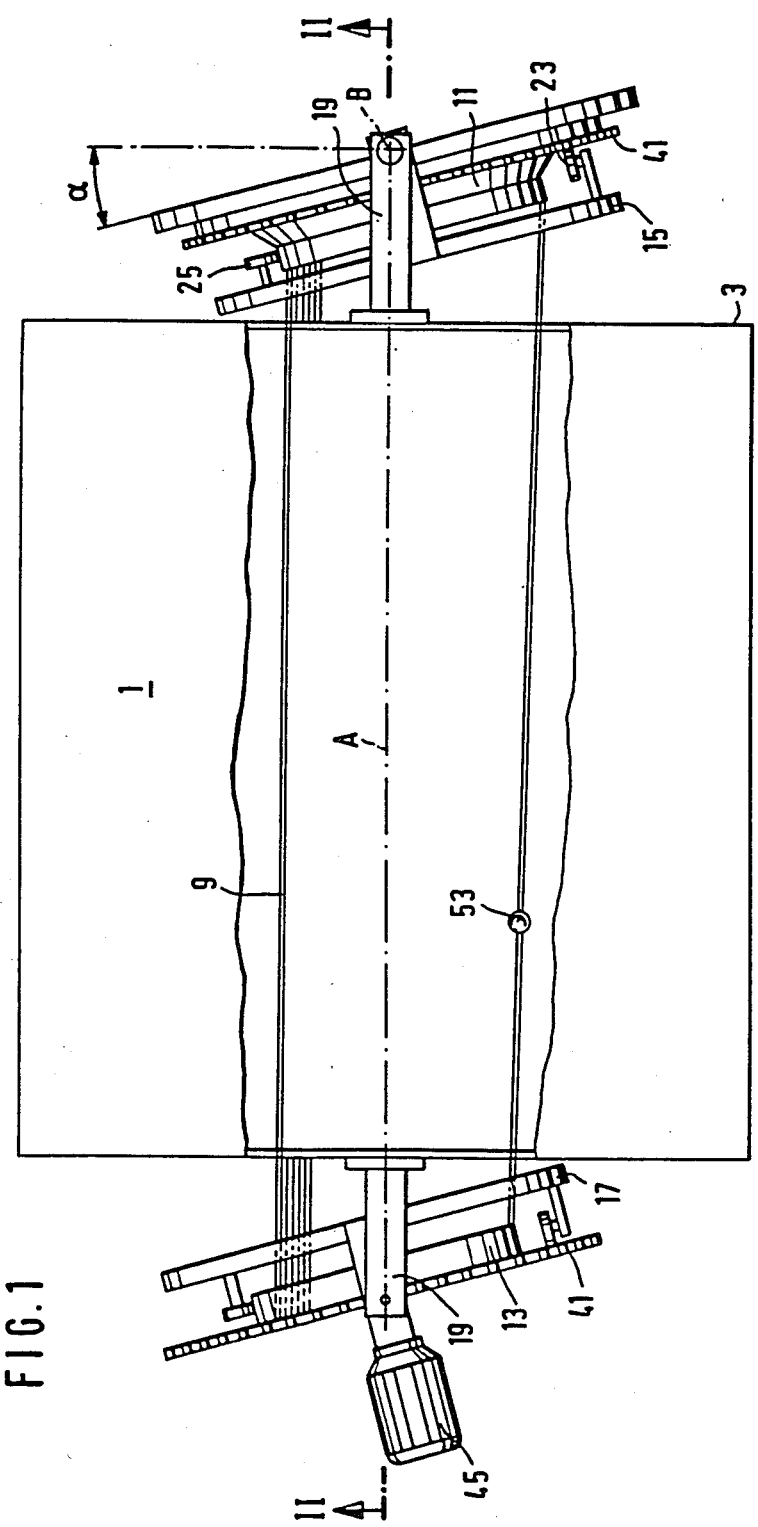
FIG. 1 is a fragmentary plan view of an apparatus which embodies one form of the invention, a portion of the housing being broken away and several components of the shell being omitted.
Figure 2:
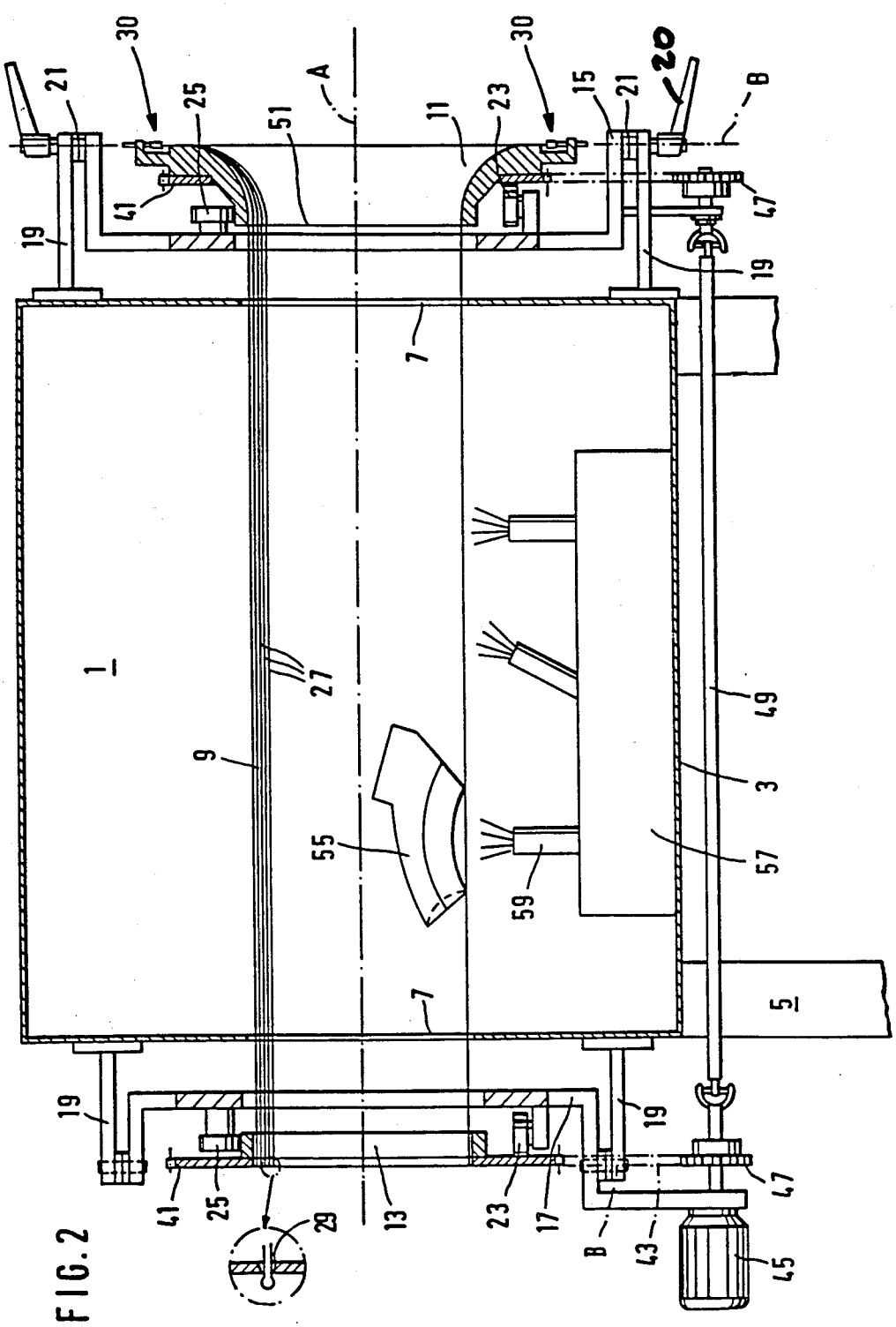
FIG. 2 is a sectional view as seen in the direction of arrows from the line II—II of FIG. 1.

Referring first to FIGS. 1 to 4, there is shown an apparatus 1 which serves to treat discrete workpieces 55 with one or more jets of water or another fluid, with flames and/or in any other way which renders it necessary to change the orientation of workpieces during their treatment. The apparatus 1 comprises a housing or casing 3 which is mounted on upright legs 5 and has two end walls provided with centrally located openings 7.

The housing 3 confines the central portion of an elongated cylindrical or substantially cylindrical cage-like shell 9 forming part of a receptacle which is rotatable about a substantially horizontal axis A. The end portions of the shell 9 extend from the housing 3 through the respective openings 7. The shell 9 is assembled of an annulus of parallel or substantially parallel elongated components 27 in the form of wires, cords, ropes, strips, rods or the like. The gaps between neighboring components 27 are selected with a view to prevent the escape of workpieces 55 which are introduced (e.g., by hand or by a suitable conveyor, not shown) into one end portion of the receptacle including the shell 9 and two annular end walls 11 and 13 which constitute wobble plates and are separably affixed to the respective end portions of the components 27 in such a way that each of the end walls 11 and 13 can be tilted relative to the components 27 without causing any, or any pronounced, flexure of the components. The components 27 are substantially parallel to the axis A. The end walls 11 and 13 are rotatably mounted in disc-shaped carriers 15, 17 which are pivotable or tiltable about horizontal or vertical axes B extending at right angles to the axis A. The end walls 11 and 13 and the carriers 15, 17 are located outside of the housing 3. The carriers 15, 17 are pivotally mounted on holders 19 which are affixed to the housing 3. Toothed or serrated arresting elements 21 are provided to hold the carriers 15, 17 in selected angular positions (at a selected angle alpha) with reference to the axis A. The inclination of the carriers 15, 17 can be changed by manipulating the handles 20. One set of handles (e.g., for the carrier 15) suffices because the components 27 compel the other carrier to share all angular movements of the one carrier.

Each of the carriers 15, 17 is provided with at least three spaced-apart rollers 23 whose axes intersect the axis A in such a way that the axes of rollers 23 on the carrier 15 intersect the axis A at a first point and the axes of the rollers 23 on the carrier 17 intersect the axis A at a second point. Each of the carriers 15, 17 is further provided with at least three spaced-apart rollers 25 whose axes intersect and are normal to the respective axes B. The rollers 23, 25 on the carrier 15 together constitute an antifriction bearing for the end wall 11, and the rollers 23, 25 on the carrier 17 constitute a bearing for the end wall 13.

The components 27 are tensioned between the end walls 11 and 13. To this end, the left-hand end portions of the components 27 are provided with enlarged portions in the form of substantially spherical heads (see the structure within the phantom-line circle in the left-hand portion of FIG. 2) which are outwardly adjacent to the end wall 11. Those portions of the components 27 which are immediately adjacent to the respective heads extend through holes which are provided in the end wall 13 and are bounded by frustoconical surfaces 29 to ensure that the components 27 do not rub against the end wall 13 when the latter is rotated in the respective bearings 23, 25 to thereby move the components 27 in parallelism with the axis A of the receptacle including the shell 9.

Figure 3:
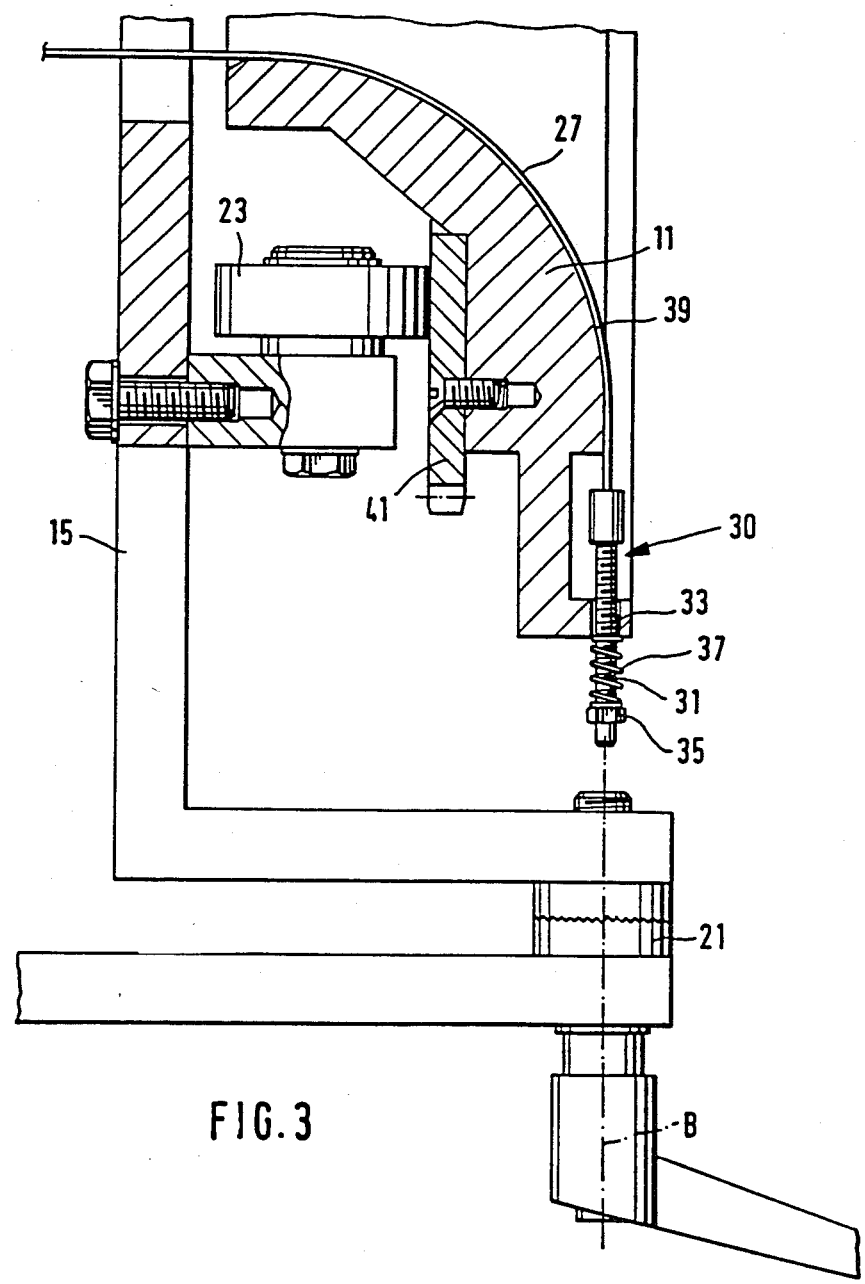
FIG. 3 is an enlarged view of a detail in the apparatus of FIGS. 1 and 2, showing the manner in which one end portion of a component of the shell is secured to the respective end wall of the receptacle by an adjustable tensioning device.
Figure 4:
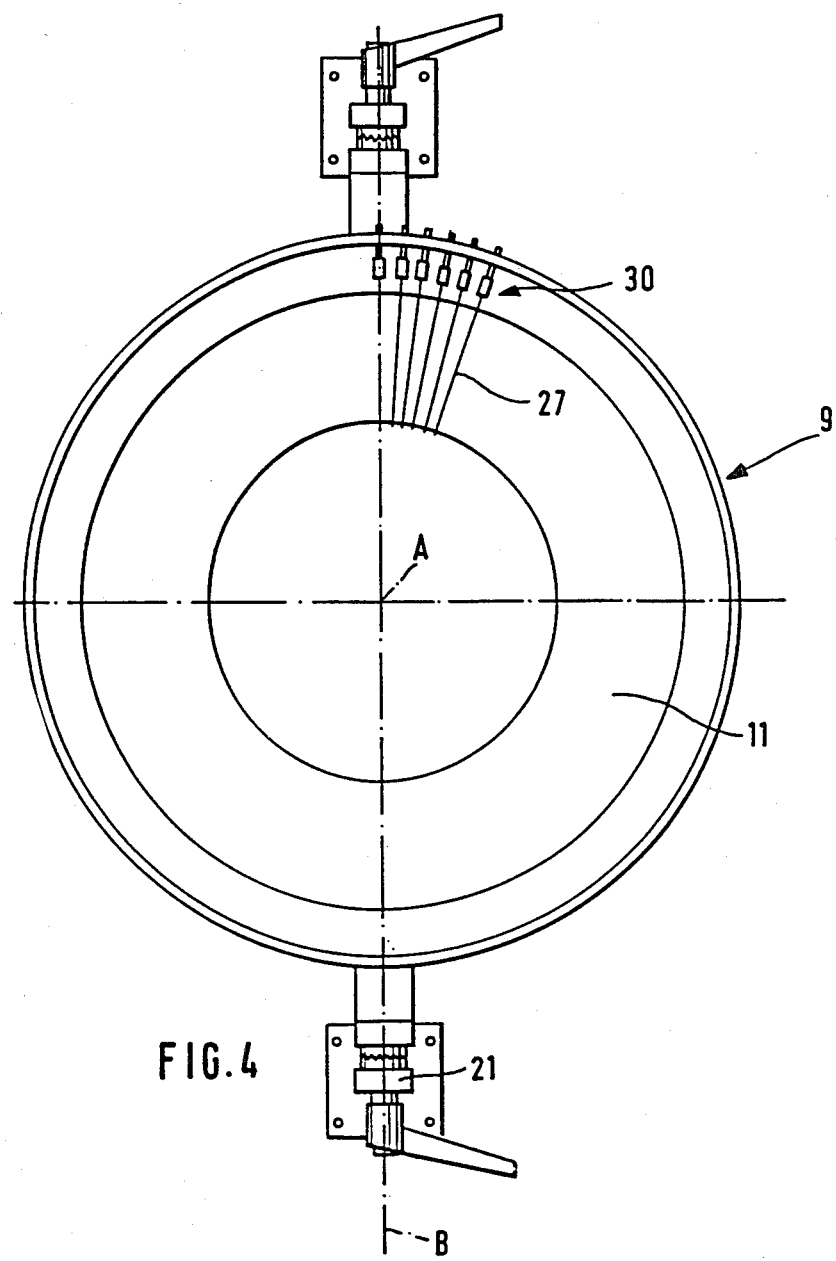
FIG. 4 is an end elevational view of the receptacle for workpieces as seen from the right-hand side of FIG. 2

The other end portion of each component 27 is coupled to the end wall 11 by a discrete tensioning device 30 the details of one of which can be seen in FIG. 3. It is equally within the purview of the invention to provide a common tensioning device 30 or an analogous tensioning device for two or more neighboring components 27. Each tensioning device 30 comprises an externally threaded shank or post 31 one end portion of which is permanently or separably affixed to one end portion of the respective component 27 and a median portion of which extends through a bore 33 of the end wall 11. The other end portion of the shank 31 mates with a nut 35 serving as a stop for one end portion of a stressed helical spring 37 which surrounds the shank 31 between the end wall 11 and the nut 37 and maintains the respective component 27 under requisite tension by bearing against the nut 37. Those portions of the components 27 which are adjacent to the respective holes or bores 33 abut against an annular convex internal surface 39 of the end wall 11. The diameter of such internal surface increases gradually in a direction away from the end wall 13.

The means for rotating the end walls 11 and 13 comprises ring gears 41 each of which can constitute a toothed pulley or a sprocket wheel. The ring gears 41 receive torque from driver gears in the form of pinions 47 through the medium of endless toothed belts or chains 43. One of the pinions 47 is rotatably mounted on the carrier 17 and is driven by an electric motor 45. The other pinion 47 receives torque from the output element of the motor 45 by way of a cardan joint 49. The ring gears 41 can be made of hardened metallic material and can provide tracks for the respective sets of rollers 23 (see particularly FIG. 3).

In their starting positions, the end walls 11 and 13 are disposed in two parallel planes which are normal to the axis A. Each of these end walls has a centrally located aperture 51 having a circular outline. The aperture 51 in the end wall 11 is adjacent to the aforementioned outwardly flaring internal surface 39 for the respective end portions of the elongated components 27. The number of components 27 (and hence the width of the gaps between neighboring components) is selected with a view to account for the dimensions and the weight of workpieces 55 which are to be treated on their way from one end portion toward the other end portion of the shell 9. As a rule, the combined area of gaps between the components 27 can be between 80 and 95 percent of the area of the internal surface of an imaginary cylindrical shell whose inner diameter matches that of the shell 9.

Intermediate portions of the components 27 (between the end walls 11 and 13) can be provided with spherical or otherwise configured enlargements 53 and/or other suitable obstructions which interfere with unpredictable advancement of workpieces 55 from the one end toward the other end of the shell 9. Each of the obstructions 53 can be made of a ductile material and can be provided with an axial hole or an open slot so that it can be slipped onto the selected component 27 prior to being deformed to assume a desired position intermediate the end walls 11 and 13.

The reference character 57 denotes a spraying unit having several (e.g., three) nozzles 59 which discharge jets or sprays of a gaseous, liquid or flowable solid treating medium so that the medium impinges upon the workpieces 55 which advance within the confines of the shell 9 from the end wall 11 toward the end wall 13 or vice versa in response to rotation of the end walls and simultaneous oscillation of such end walls to an extent which is determined by the selected inclination of the planes of carriers 15, 17 relative to the axis A. The spraying unit 57 is mounted in the housing 3 at a level below the central portion of the shell 9. The inclination of the nozzles 59 with reference to the main portion of the unit 57 can be changed by hand or otherwise so as to select the direction of sprays which impinge upon the advancing workpieces 55. Two or more spraying units or other types of treating units can be installed in the housing 3 without departing from the spirit of the invention.

The mode of operation of the apparatus which is shown in FIGS. 1 to 4 is as follows:

Batches of discrete workpieces 55 or individual workpieces are admitted into one end portion of the shell 9, either by hand or by one or more conveyors. If the planes of the carriers 15, 17 (and hence the planes of the end walls 11 and 13) are normal to the axis A, the components 27 of the shell merely orbit about the axis A but do not perform any reciprocatory movements. The workpieces 55 then merely roll within the confines of the shell 9 but do not advance in the direction of the axis A. As a rule, the workpieces 55 remain in the lower part of the shell 9 (i.e., at a level below the axis A). The nozzles 59 are preferably (or can be) shut off as soon as the end walls 11 and 13 are caused to assume their starting positions (in which the components 27 do not perform any reciprocatory movements).

If the person in charge wishes that the workpieces 55 advance in the direction of the axis A, the inclination of the end walls 11 and 13 with reference to the axis A is changed through a preselected angle by changing the inclination of the carriers 15, 17, i.e., by pivoting or tilting the carriers about the respective vertical axes B so that the axis A and the end walls 11, 13 then make an oblique angle. The direction of advancement of workpieces 55 can be selected by pivoting the carriers 15, 17 to the one or to the other side of their neutral positions (at right angles to the axis A) and/or by changing the direction of rotation of the end walls 11 and 13. The motor 45 is or can constitute a reversible motor. The reciprocating components 27 then cause the workpieces 55 to continuously change their orientation relative to the nozzles 59 as well as to advance longitudinally of the shell 9 and to be discharged by way of one of the apertures 51 so as to descend into a suitable intercepting receptacle, not shown. The effective distance between the orifices of the nozzles 59 and the workpieces 55 remains unchanged because the sprays of flowable material which issues from the nozzles 59 impinge only upon those surfaces of the workpieces which face the unit 57 and also because the workpieces 55 are normally located in the lower portion of the shell 9, i.e., in that portion which is nearer to the unit 57. The operator can select the interval of dwell of a workpiece 55 in the range of sprays which issue from the nozzles 59 by selecting the angles alpha for the end walls 11, 13 and/or by selecting the RPM of the end walls.

Accurate selection of the intervals of dwell of workpieces in the range of flowable media issuing from the nozzles 59 is important and necessary in many instances. For example, if the workpieces 55 are made of or contain a synthetic plastic material and the nozzles 59 discharge flames which are to heat and/or otherwise influence the appearance and/or other characteristics of the workpieces, the operator can select the period of dwell of each such workpiece within the range of flames which issue from the nozzles 59 and the frequency at which each portion of the external surface of a workpiece is subjected to the action of flames issuing from the first, second and third nozzle 59. The flexibility or lack of flexibility of components 27 will depend on the weight of discrete workpieces 55, on the combined weight of workpieces 55 in the shell 9 and/or on the nature of treatment (e.g., whether the workpieces are treated by a hot medium, by a cold medium, by a medium which is discharged at an elevated pressure or by a medium which is likely to rapidly erode, abrade and/or otherwise adversely influence the material of the shell).

Figure 5:
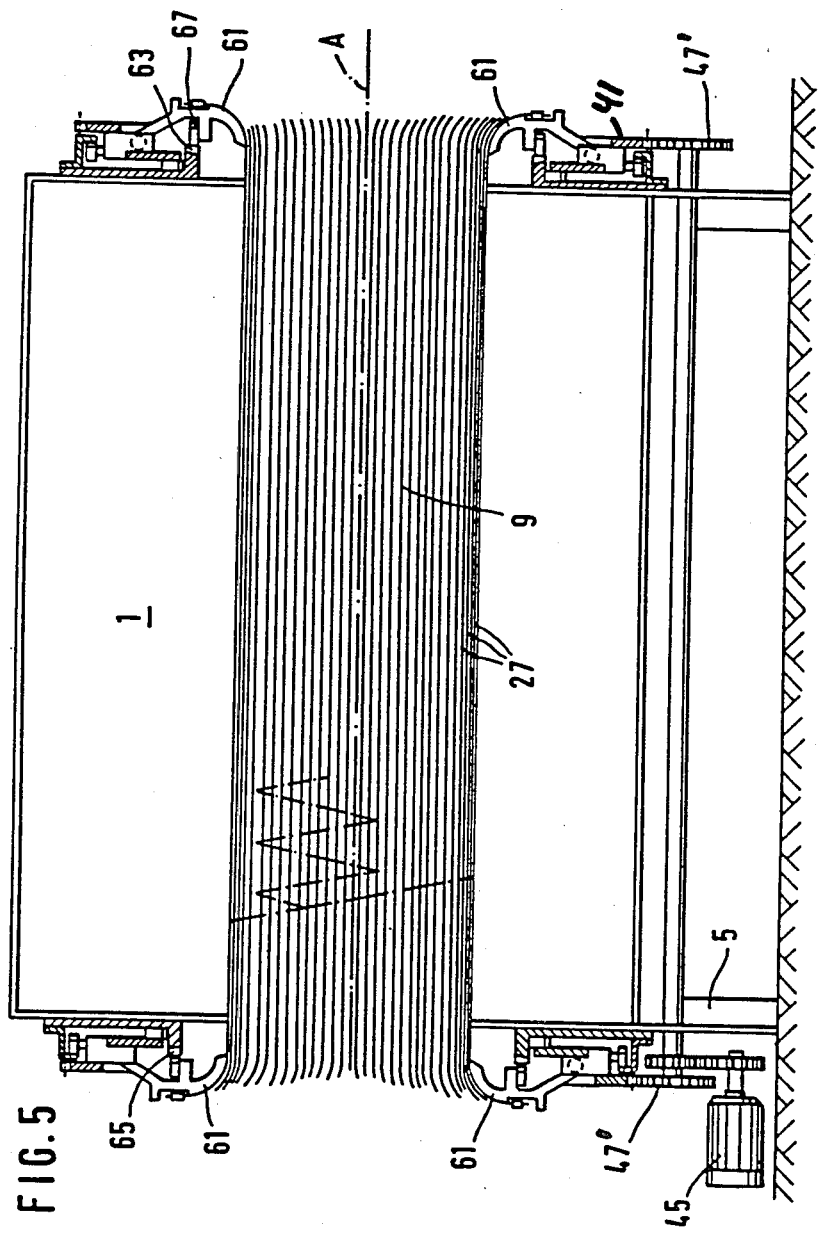
FIG. 5 a fragmentary longitudinal sectional view of second apparatus.
Figure 6:
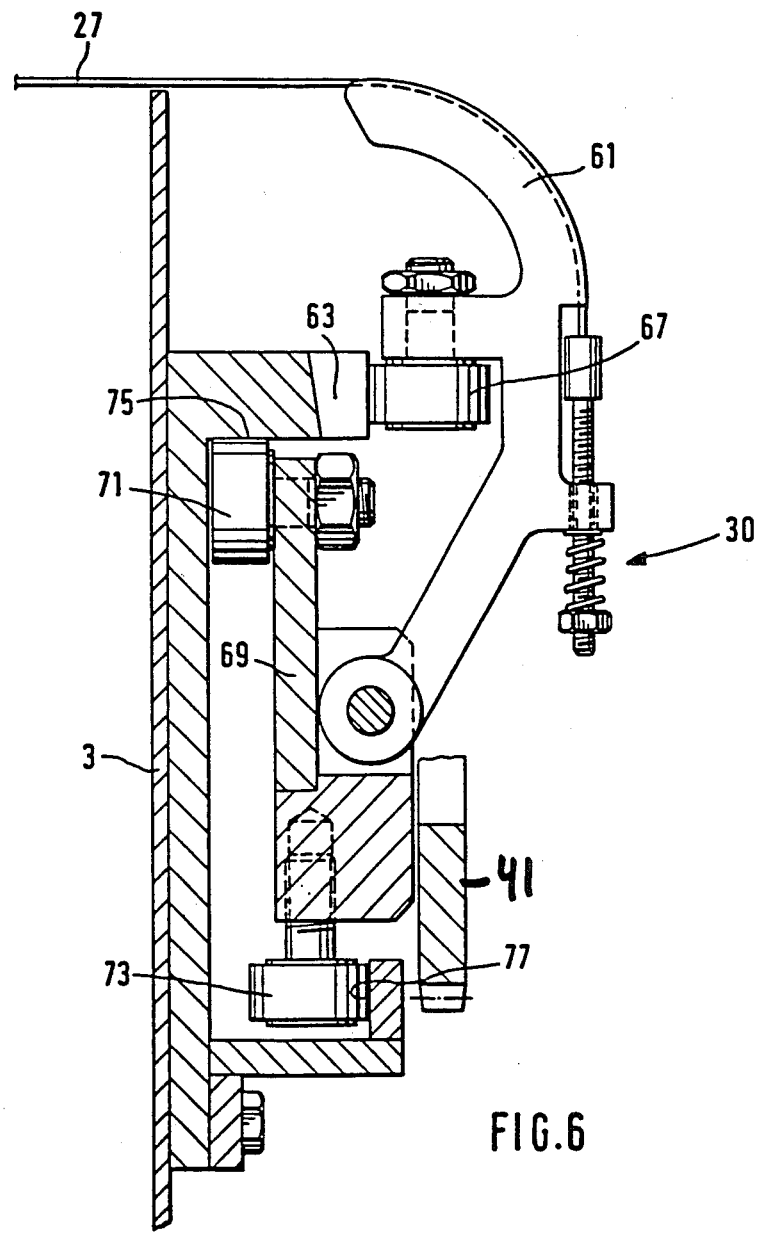
FIG. 6 an enlarged view of a detail in the right-hand portion of FIG. 5.

FIGS. 5 and 6 illustrate a portion of a modified apparatus. The end walls or wobble plates 11 and 13 of the first apparatus are replaced with composite end walls each of which comprises a plurality of pivotable levers 61 each having an inner portion (nearer to the axis A) which is attached to the respective end portion or portions of one or more elongated wire-like, rod-like or similar components 27 and an outer portion provided with a roller follower 67 tracking a stationary cam 63 or 65 at the respective axial end of the cage-like shell 9. The configuration of the cams 63 and 65 is such that each of the components 27 is moved in parallelism with the axis A in one direction while at a level below the axis A and in the opposite direction while advancing about the axis A at a level above such axis. The cams 63 and 65 are affixed to the respective end walls of the housing 3. The two cams 63 and 65 are complementary to each other so as to ensure that the tension upon the components 27 remains at least substantially unchanged during each and every stage of rotation of the shell 9 about the axis A. In other words, pairs of levers 61 which are coupled to each other by one or more components 27 are compelled to perform identical angular movements about their respective pivot axes (which are substantially tangential to the shell 9) as well as to rotate in the same direction.

The pivots for the levers 61 are provided on two ring-shaped supports 69 which are rotated by the motor 45 via ring gears 41 and gear trains 47' analogous to the pinions 47 described in connection with FIGS. 1 to 4. The manner in which the end portions of the components 27 are separably affixed to and tensioned by the respective pairs of levers 61 is analogous to the manner in which the components 27 of the apparatus 1 of FIGS. 1-4 are affixed to the end walls 11 and 13. If desired, a tensioning device 30 can be provided for each end portion of each component 27. This also applies for the apparatus 1 of FIGS. 1 to 4.

The supports 69 carry sets of rollers 71 and 73 which travel along tracks 75 and 77 provided on the respective end walls of the housing 3 so as to ensure that the levers 61 travel along predetermined paths and are free to pivot relative to their supports 69 under the action of the respective cams 63, 65.

If the operator wishes to change the extent of reciprocatory movement of the components 27 in response to rotation of the supports 61 about the axis A of the shell 9, the illustrated cams 63, 65 are replaced with differently configurated cams which are capable of pivoting the levers 61 to a desired extent.

The components 27 can constitute thin wires or thin rods, as long as they provide gaps which suffice for penetration of a flowable medium into contact with workpieces which are agitated and otherwise moved by the components during travel from one toward the other axial end of the shell 9.

The apparatus 1 of FIGS. 7 to 12 constitutes a further modification of the apparatus of FIGS. 1 to 4 and, therefore, all parts which are identical with or clearly analogous to those of the apparatus of FIGS. 1 to 4 are denoted by similar reference characters. The components 27 of the cage-like shell 9 are secured to the end walls 11 and 13 of the receptacle in a different way. Since the end wall 11 is identical with the end wall 13, only one of these end walls will be described in detail.

The end wall 11 is assembled of three coaxial annular sections or rings 79, 81 and 83. The ring 79 has an L-shaped cross-sectional outline and has tracks for the rollers 23, 25 of the end wall 15. The rings 81 and 83 are secured to the ring 79 and have radially inwardly extending resilient prongs or fingers 85 whose radially innermost portions or tips are secured to the respective ends of the corresponding components 27 (see FIGS. 9 and 10). The prongs 85 of the ring 81 are angularly offset with reference to the prongs 85 of the ring 83 so that the mutual spacing of neighboring components 27 (as considered in the circumferential direction of the end wall 11) is the same. The ring 81 or 83 can be omitted if the apparatus is used for surface treatment of relatively large objects which allow for the provision of wider gaps between neighboring components 27.

Figure 11:
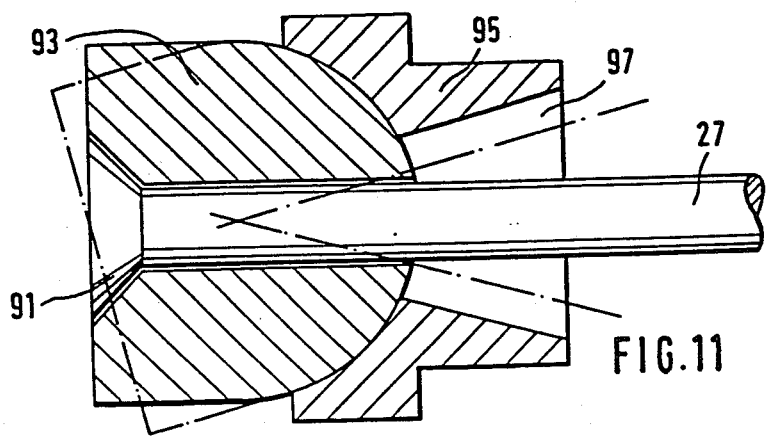
FIG. 11 an enlarged view of a detail within the phantom-line circle XI of FIG. 10.
Figure 12:
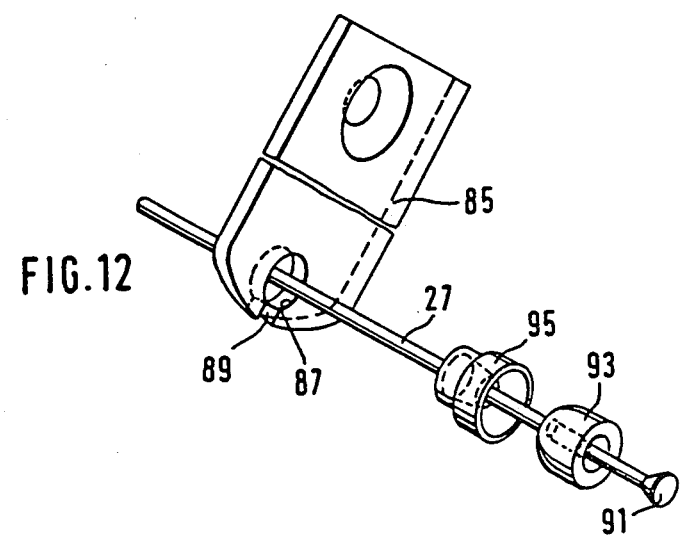
FIG. 12 is a fragmentary exploded perspective view of one end portion of a component and of the means for mounting it in the respective end wall of the apparatus which is shown in FIGS. 7 to 11.

The tips of the prongs 85 have circular holes 87 (see FIG. 12) and open slots 89 each of which communicates with the respective hole 87 and extends radially to the nearest portion of the edge face of the respective prong 85. The end portions of the components 27 have enlarged portions in the form of conical heads 91 received in substantially spherical sockets 93 which are free to swivel in cupped members 95. Each cupped member 95 has a smaller-diameter portion which is received in the corresponding hole 87. The cups 95 have passages bounded by frustoconical internal surfaces 97 (FIG. 11) which flare in directions away from the respective heads 91 so as to enable the sockets 93 to swivel in their cupped members 95 through predetermined angles while the components 27 remain out of contact with the members 95. The cone which is described by the end portion of a component 27 while the end wall 11 rotates relative to the housing 3 of the apparatus 1 of FIGS. 7-12 is denoted by two phantom lines in the right-hand portion of FIG. 11. Such construction and mounting of the end portions of components 27 ensure that the components are not subjected to appreciable bending stresses while the end wall 11 acts not unlike a wobble plate or swash plate and causes the components 27 to move axially back and forth while the components orbit about the axis A. Another important advantage of the construction which is shown in FIGS. 11 and 12 is that the components 27 can be removed from or reattached to the end wall 11 in a simple and time-saving manner. Certain or all of the components 27 will be replaced when the apparatus is to be converted for treatment of widely different workpieces (e.g., for treatment of very heavy workpieces following the treatment of a series of lightweight workpieces or vice versa). Furthermore, certain components 27 will require replacement as a result of wear or other damage.

In a first step, the cupped members 95 are slipped onto the components 27 adjacent to the end wall 11, and the smaller-diameter portions of the members 95 are then inserted into the respective holes 87. In the next step, one of the prongs 87 (on the end wall 11 or 13) is subjected to elastic deformation so as to allow for insertion of the smaller-diameter portion of the other cup-shaped member 95 on the component 27 into the hole 87 of a prong 85 on the end wall 13. The insertion involves a movement of the component 27 through the respective slot 89. The previously deformed prong 85 is then allowed to dissipate some energy and to tension the properly installed component 27. Pairs of sockets 93 and cup-shaped members 95 are slipped onto the components 27 before the components are affixed to the respective pairs of prongs 85. Such assembly of components 27 with pairs of sockets and cupped members takes place prior to making of at least one of the heads 91.

Figure 7:
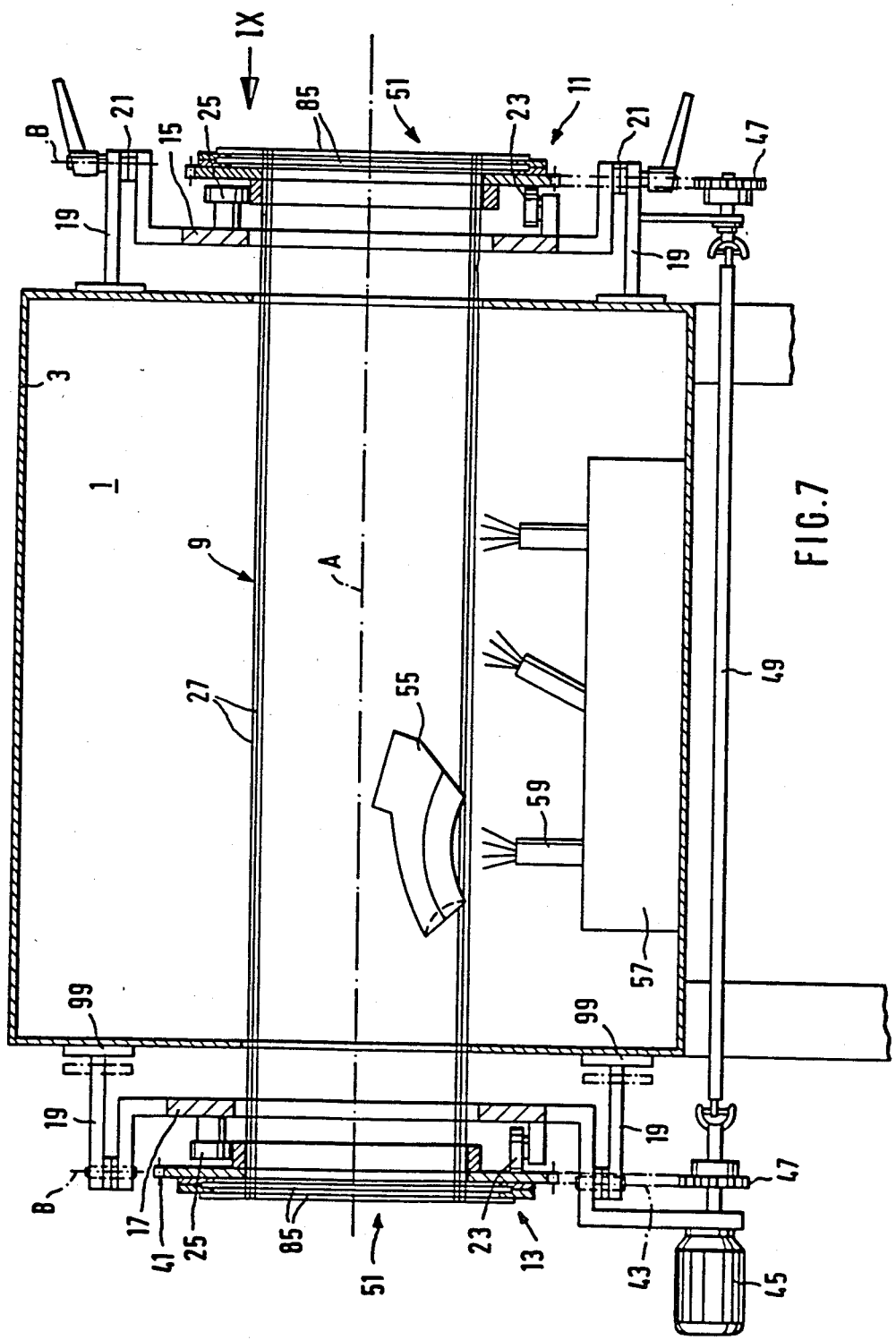
FIG. 7 a central longitudinal sectional view of a third as seen in the direction of arrows from VII—VII of FIG. 8.
Figure 8:
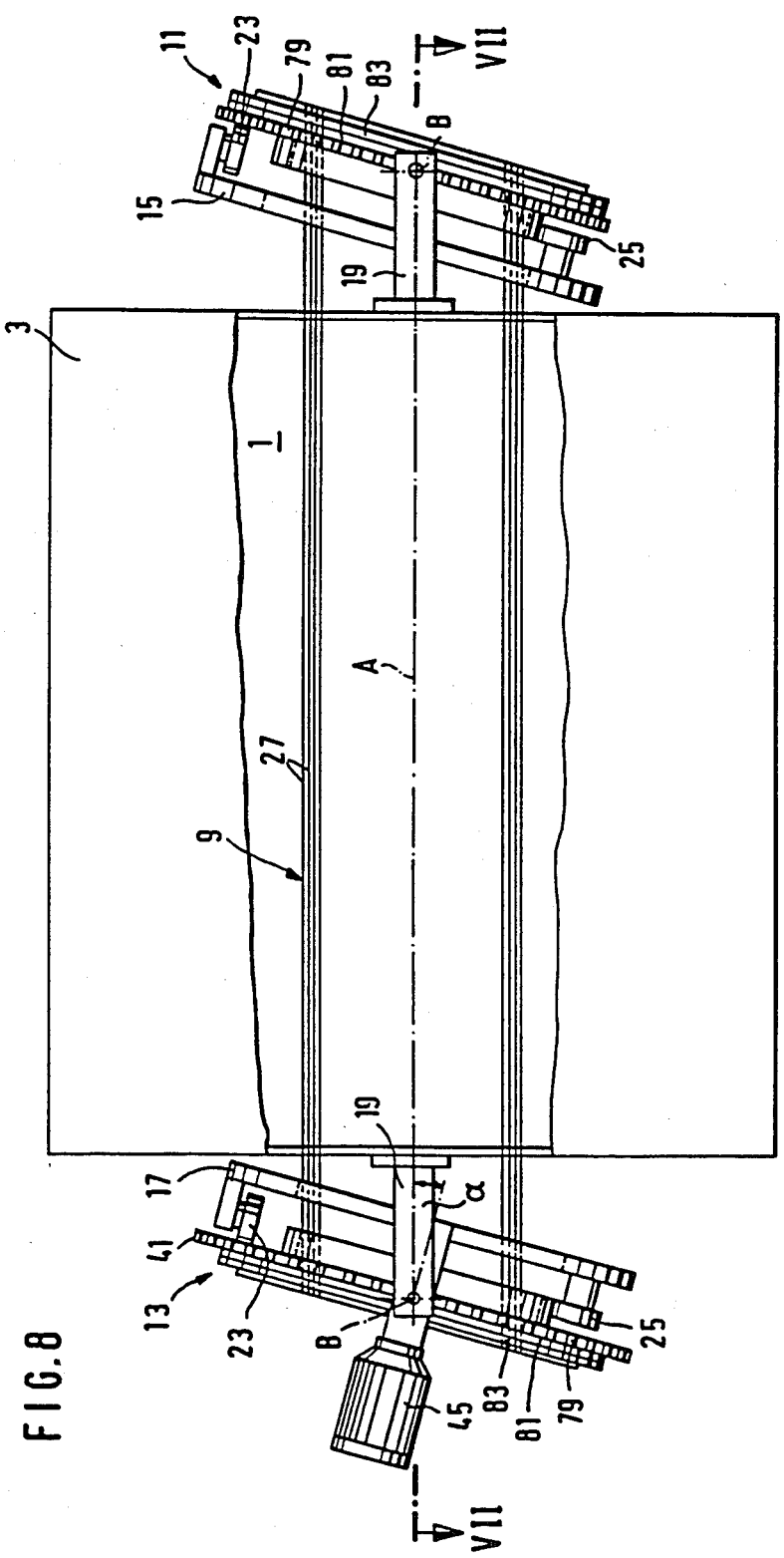
FIG. 8 is a plan view of the third apparatus, with certain parts omitted or broken away.
Figure 9:
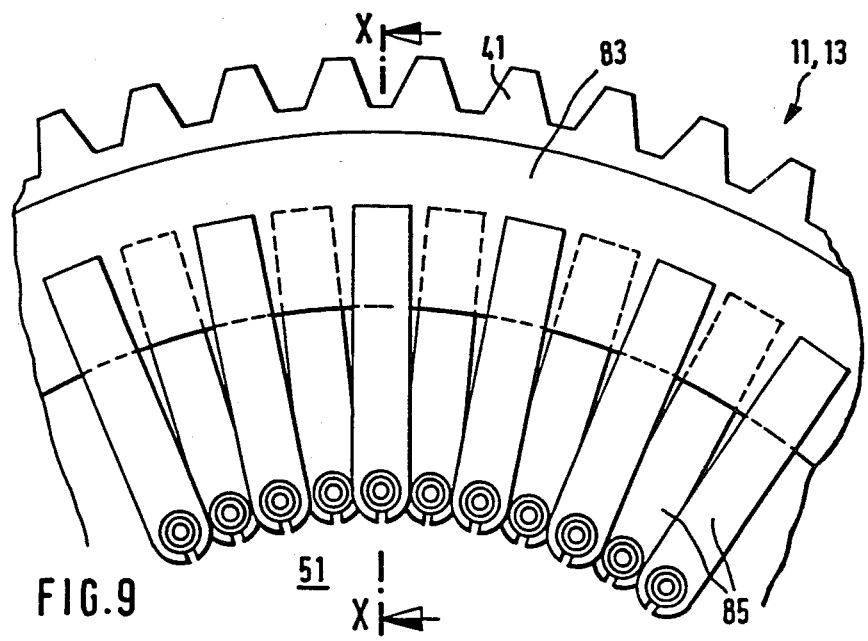
FIG. 9 is an enlarged fragmentary end elevational view as seen in the direction of arrow IX in FIG. 7.
Figure 10:
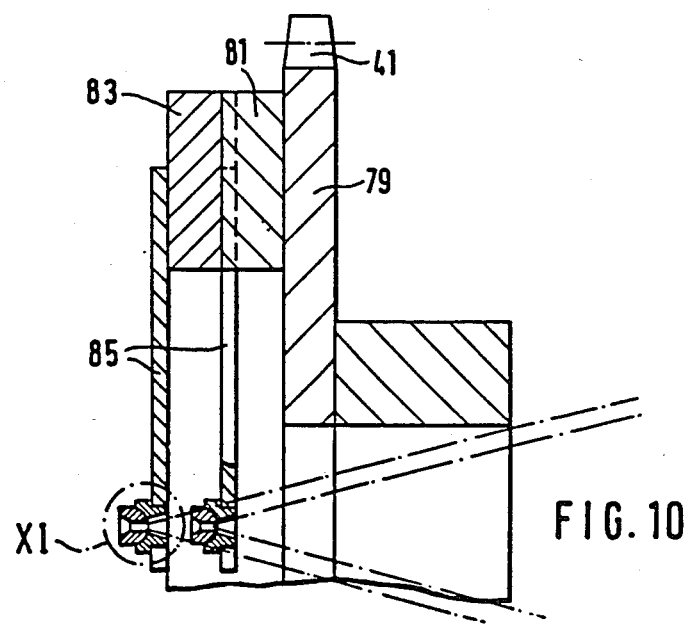
FIG. 10 is a sectional view as seen in the direction of arrows from the line X—X of FIG. 9.

The components 27 can be tensioned in a different way, e.g., in a manner as shown in FIG. 7. Thus, the bearings 99 which are used to mount the carrier 17 on the housing 3 can be adjustably secured to the housing so that the carrier 17 can be placed at a selected distance from the carrier 15 and thus subjects the components 27 of the shell 9 to a predetermined tensional stress. Second positions of the left-hand supports 99 are shown in FIG. 7 by phantom lines.

A single motor 45 can be used to drive both end walls of the receptacle when the latter is relatively short. Thus, a cardan joint 49 is necessary only when the length of the housing 3 and shell 9 is such that the components 27 would undergo excessive tensional and twisting stresses during transmission of torque from one of the end walls to the other end wall of the receptacle for workpieces 55. The length of the cardan joint 49 can change, especially if the bearings 99 for one of the carriers 15, 17 are adjustable in a manner as shown in the left-hand portion of FIG. 7.

Figure 13:
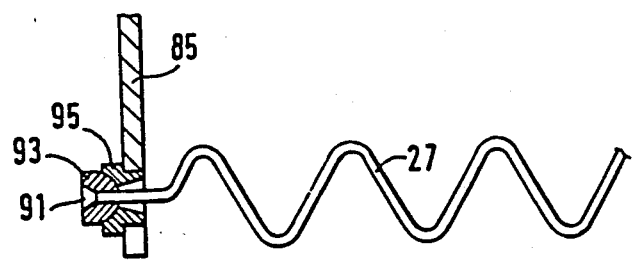
FIG. 13 is a fragmentary sectional view of a fourth apparatus wherein the receptacle comprises elastically deformable spiral components.

FIG. 13 shows a portion of a further apparatus wherein the components 27 of the shell are spirals which tend to contract in the axial direction of the shell and are installed in prestressed condition. The material of the components 27 is spring steel or an elastomeric synthetic plastic substance. The utilization of elastically deformable (stretchable) components 27 further simplifies their mounting in and their detachment from the end walls of the receptacle. The manner in which the end portions of the spiral components 27 are mounted on the respective end walls is preferably the same as described with reference to FIGS. 7 to 12. FIG. 13 merely shows one of the prongs 85 at one axial end of the receptacle. The prongs 85 for the elastically deformable components 27 of FIG. 13 may but need not be elastic.

An important advantage of the improved apparatus is that it can subject each of a short or long series of workpieces to identical treatment. Furthermore, the apparatus is relatively simple, compact and highly versatile so that it can be used for surface treatment of a wide variety of workpieces. All or some of the operations can be automated, depending on the number of the articles in a series of identical or similar articles which require treatment. Still further, the parts which are likely to undergo extensive wear are readily accessible for inspection, repair or replacement. The components 27 of the shell 9 treat the workpieces gently so that the apparatus can be used for surface treatment of robust as well as highly sensitive workpieces. The treatment can involve short-lasting or longer-lasting exposure of successive workpieces to the action of a single medium or two or more similar or widely different media.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for continuously changing the orientation of workpieces, comprising an elongated receptacle rotatable about a substantially horizontal axis and having a tubular shell including a plurality of spaced-apart elongated components each extending in substantial parallelism with said axis and each having a first and a second end portion, said shell having a lower portion at a level said axis, an upper portion, a first end portion arranged to receive workpieces, and a second end portion, said receptacle further comprising substantially parallel first and second end walls connected to the respective end portions of said components; means for rotating said shell about said axis; and means for reciprocating said components, at least in the lower portion of said shell, to thereby advance the workpieces from said first end portion toward said second end portion of said shell, said reciprocating means including means for maintaining said end walls at an oblique angle with reference to said axis while said shell rotates about said axis.

2. The apparatus of claim 1, wherein said components include wires.

3. The apparatus of claim 1, wherein said components include rods.

4. The apparatus of claim 1, wherein; said rotating means comprising a first gear provided on at least one of said wobble plates and a motor-driven second gear mating with said first gear.

5. The apparatus of claim 1 wherein said receptacle further comprises means for tensioning said components.

6. The apparatus of claim 5, wherein said tensioning means includes means for securing the second end portions of said components to said second end wall.

7. The apparatus of claim 1, wherein said receptacle further comprises obstacles provided on at least some of said components to regulate the rate of advancement of workpieces from the first toward the second end portion of said shell.

8. The apparatus of claim 1, wherein at least one of said end walls has prongs and the respective end portions of said components are secured to said prongs.

9. The apparatus of claim 1, further comprising means for treating the surfaces of workpieces in said shell.

10. The apparatus of claim 9, wherein said treating means comprises means for heating, drying, washing and/or deburring the workpieces in said shell.

11. The apparatus of claim 9, wherein said treating means includes means for directing at least one stream of a pressurized flowable medium from the outside of said shell, between said components and against the workpieces in said shell.

12. The apparatus of claim 11, wherein said directing means is adjacent to the lower portion of said shell.

13. The apparatus of claim 11, further comprising means for adjusting the position of said directing means relative to said shell.

14. The apparatus of claim 9, wherein said treating means comprises means for directing at least one stream of burning fuel, steel shot, a mixture of steel shot and a gaseous carrier medium, hot air or a flowable washing medium against the workpieces in said shell.

15. Apparatus for continuously changing the orientation of workpieces, comprising an elongated receptacle rotatable about a substantially horizontal axis and having a tubular shell including a plurality of spaced-apart elongated components each extending in substantial parallelism with said axis and each having a first and a second end portion, said shell having a lower portion at a level below said axis, an upper portion, a first end portion arranged to receive workpieces, and a second end portion, said receptacle further comprising first and second plates connected to the respective end portions of said components; means for rotating said shell about said axis; and means for reciprocating said components, at least in the lower portion of said shell, to thereby advance the workpieces from said first end portion toward said second end portion of said shell, said reciprocating means including means for changing the inclination of said plates with reference to said axis.

16. The apparatus of claim 15, wherein said inclination changing means comprises first and second carriers rotatably mounting the respective plates, said carriers being turnable about axes which are normal to the axis of said receptacle.

17. The apparatus of claim 16, further comprising arresting means for holding said carriers in selected angular positions.

18. Apparatus for continuously changing the orientation of workpieces, comprising an elongated receptacle rotatable about a substantially horizontal axis and having a tubular shell including a plurality of spaced-apart elongated components each extending in substantial parallelism with said axis and each having a first and a second end portion, said shell having a lower portion at a level below said axis, an upper portion, a first end portion arranged to receive workpieces, and a second end portion, said receptacle further comprising a first end wall adjacent to the first end portions of said components, a second end wall adjacent to the second end portions of said components, and means for securing the end portions of said components to the respective end walls, said securing means comprising substantially spherical sockets provided on at least one end portion of each component and substantially cup-shaped members for said sockets, said cup-shaped members being removably installed in the respective end wall of said receptacle; means for rotating said shell about said axis; and means for reciprocating said components, at least in the lower portion of said shell, to thereby advance the workpieces from said first end portion toward said second end portion of said shell.

19. The apparatus of claim 18, wherein said one end wall has holes for portions of said cup-shaped members.

20. The apparatus of claim 19, wherein said one end wall has prongs and said holes are provided in said prongs.

21. The apparatus of claim 20, wherein said one end wall has several coaxial annular sections and said prongs are provided on said sections in several planes extending transversely of said axis.

22. Apparatus for continuously changing the orientation of workpieces, comprising an elongated receptacle rotatable about a substantially horizontal axis and having a tubular shell including a plurality of spaced-apart elongated components each extending in substantial parallelism with said axis and each having a first and a second end portion, said shell having a lower portion at a level below said axis, an upper portion, a first end portion arranged to receive workpieces, and a second end portion, said receptacle further comprising a first end wall adjacent to the first end portions and a second end wall adjacent to the second end portions of said components, at least one of said end walls having prongs extending substantially radially inwardly toward said axis and the respective end portions of said components being separably secured to said prongs; means for rotating said shell about said axis; and means for reciprocating said components, at least in the lower portion of said shell, to thereby advance the workpieces from said first end portion toward said second end portion of said shell.

23. Apparatus for continuously changing the orientation of workpieces, comprising an elongated receptacle rotatable about a substantially axis and having a tubular shell including a plurality of elongated components each extending in substantial said axis and each having a first and a second end portion said shell having a lower portion at a level below said axis, an upper portion, a first end portion arranged to receive workpieces, and a second end portion, said receptacle further comprising a first end wall adjacent to the first end portions and a second end wall adjacent to the second end portions of said components, at least one of said end walls having prongs and the respective end portions of said components being secured to said prongs, at least some of said prongs being elastic; means for rotating said shell about said axis; and means for reciprocating said components, at least in the lower portion of said shell, to thereby advance the workpieces from said first end portion toward said second end portion of said shell.

24. Apparatus for continuously changing the orientation of workpieces, comprising an elongated receptacle rotatable about a substantially horizontal axis and having a tubular shell including a plurality of spaced-apart elongated components each extending in substantial parallelism with said axis and each having a first and a second end portion, said shell having a lower portion at a level below said axis, an upper portion, a first end portion arranged to receive workpieces, and a second end portion, said receptacle further comprising a first end wall affixed to the first end portions and a second end wall affixed to the second end portions of said components; a housing for said receptacle; bearing means rotatably mounting said end walls on said housing so that at least one of said end walls is movable to a plurality of positions at different distances from the other of said end walls; means for rotating said shell about said axis; and means for reciprocating said components, at least in the lower portion of said shell, to thereby advance the workpieces from said first end portion toward said second end portion of said shell.

* * * * *